March 16, 1965 C. A. URIAN 3,173,275
RAPID TRANSIT CAR AIR CONDITIONING SYSTEM
Filed Oct. 25, 1963
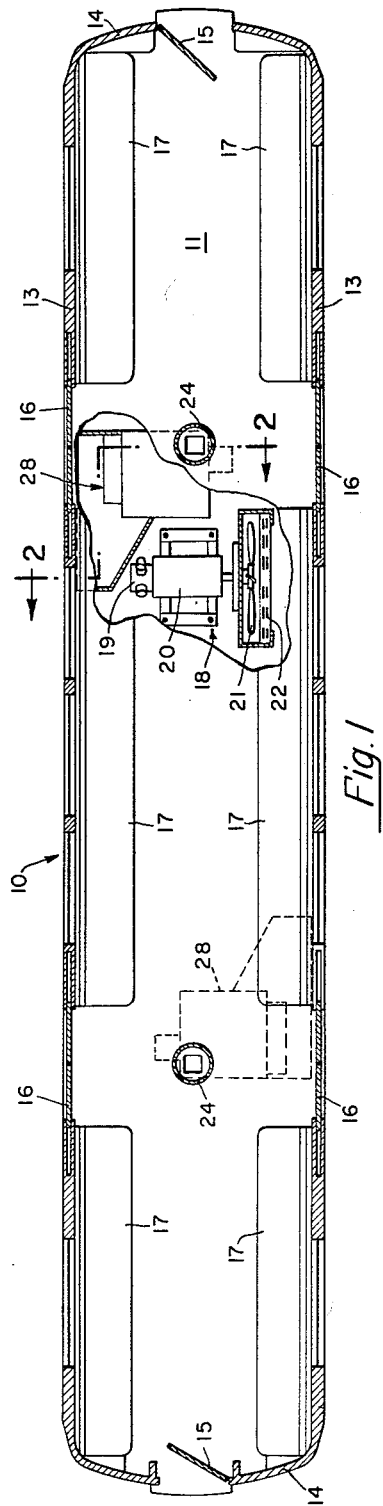
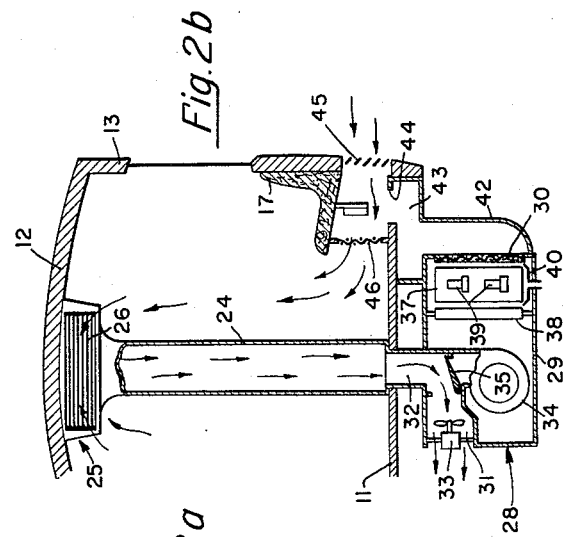
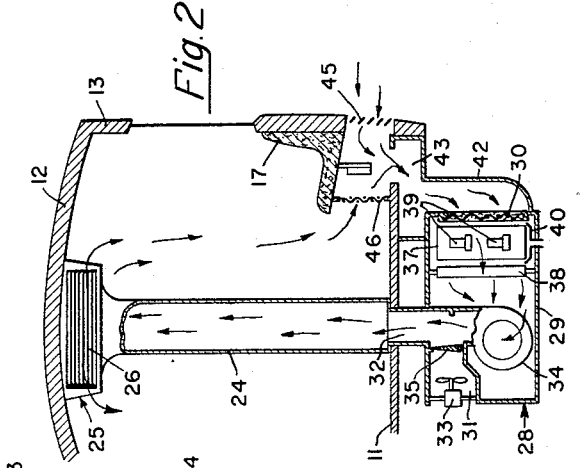
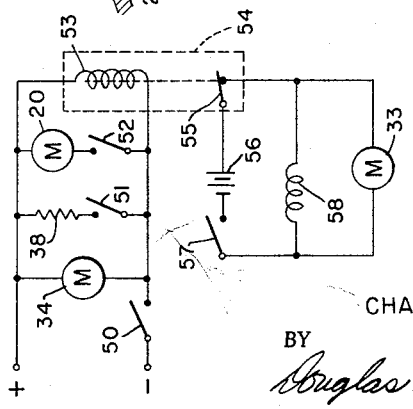
INVENTOR.
CHARLES A. URIAN
BY
ATTORNEY

United States Patent Office 3,173,275
Patented Mar. 16, 1965

3,173,275
RAPID TRANSIT CAR AIR CONDITIONING
SYSTEM
Charles A. Urian, Abington, Pa., assignor to The Budd
Company, Philadelphia, Pa., a corporation of
Pennsylvania
Filed Oct. 25, 1963, Ser. No. 319,044
13 Claims. (Cl. 62—244)

This invention relates to an air conditioning system for a vehicle such as a rapid transit car.

One of the objects of the invention is to provide a simple, inexpensive air conditioning system having conditioning apparatus mounted beneath the car floor and a simple duct system that eliminates the need for a ceiling duct system commonly used in systems of this general type.

Another object is to provide an air conditioning system that has a central compressor-condenser unit and a plurality of remote evaporator units spaced along the car below an equal number of vertical ducts that extend upwardly into the car and discharge conditioned air beneath the ceiling.

Still another object is to provide an air conditioning system for a rapid transit car wherein the conditioning apparatus is mounted beneath the car floor for good accessibility and ease of maintenance.

A further object is to provide an electrically operated air conditioning system for an electric rapid transit car, which is designed to provide an emergency exhaust, in the event of power failure, that exhausts spent air from the car and admits fresh air into the car.

Other objects and advantages of the invention will be apparent from the following description taken in connection with the accompanying drawing wherein:

FIG. 1 is a floor plan view, partly in section and with portions broken away, of a rapid transit car embodying the invention;

FIGS. 2a and 2b are somewhat schematic transverse sectional views generally on lines 2—2 of FIG. 1, illustrating different operating conditions; and FIG. 3 is a schematic wiring diagram useful in explaining certain principles of operation of the invention.

Referring now to the drawing, there is shown an exemplary embodiment of the invention applied to an electric rapid transit car 10 provided with a conventional, closed car body having a floor 11, a roof 12, a pair of side walls 13 and a pair of end walls 14 enclosing the car interior. End walls 14 are provided with doors 15 and side walls 13 are provided with sets of side opening doors 16. Each set of doors 16 is opposite to a similar set in the other side wall and are adapted to open onto side loading platforms. Mounted on floor 11 are a plurality of bench seats 17 that extend longitudinally along the inside of the side walls and define a longitudinal aisle along the center line of the floor between end doors 15 and transverse aisles between the opposed sets of doors 16.

A central compressor-condenser unit 18 is mounted on the car body beneath floor 11 and comprises a compressor 19 driven by a motor 20 that also drives a fan 21 to circulate cooling air over a condenser 22. The condenser is of sufficient capacity to handle the total or entire cooling load for the car. Floor 11 has two openings located on the longitudinal center line of the floor at the intersection therewith of the center lines of the transverse aisles, each opening being covered by a vertical, tubular duct 24 that extends upwardly from the floor through the car interior and terminates, at its upper end, in a distribution bulkhead 25 provided with two longitudinally-opening, louvered ports 26 immediately beneath the ceiling of the roof. When conditioned air is being provided, through each duct 24, the air is discharged through ports 26 and flows substantially longitudinally in opposite directions along the ceiling so as to be distributed through the car. During emergency exhaust, air in the car interior is sucked or drawn into ducts 24 through ducts 24 through ports 26.

Air is pumped through each duct 24 by fans located in an evaporator unit mounted on the car body beneath floor 11 at a point spaced from the central compressor-condenser unit. There are two evaporator units, each being of the same capacity and handling one-half the cooling load of the car. Each unit comprises a casing 29 provided with an inlet 30, an outlet 31, and a reverse flow port 32 through which air can flow in either direction in a manner more fully pointed out hereafter. Mounted in casing 29 are a radial blade, axial flow type, electric fan 33 and a centrifugal type, electric fan 34.

The interior of each casing 29 is partitioned and has mounted therein a movable damper 35 so as to define, dependent on the position of the damper, two alternate flow paths denoted a normal flow path and an exhaust flow path. The normal flow path is established when the damper is in the position shown in FIG. 2a and extends from inlet 30 to port 32 which acts as an outlet whereby operation of fan 34 draws air into the casing through inlet 30 and forces it out of the casing through port 32. The exhaust flow path is established when the damper 35 is in the position shown in FIG. 2b and extends between port 32 and outlet 31 whereby operation of fan 33 draws air into the casing through port 32 and blows it out of the casing through outlet 31 to the atmosphere beneath the car.

In each evaporator unit, a split evaporator 37 and an electric heater 38 are mounted in casing 29 and extend across the normal flow path between inlet 30 and the inlet to fan 34. A pair of selectively operable, thermostatically controlled expansion valves 39 are mounted on evaporator 37 and control the flow of refrigerant into each half of the evaporator whereby the evaporator can be used to cool air and to dehumidify air and heater 38 can be used to temper fresh air or reheat dehumidified air to a comfortable temperature. A drip pan 40 is located beneath evaporator 37 and discharges any collected condensate through the bottom of casing 29.

Each port 32 is connected to the bottom of a duct 24 to discharge air into the duct when fan 34 is operating and to draw air from the duct when fan 33 is operating. Inlet 30 is connected via a duct 42 to a plenum chamber 43 having an inlet 44 located under the end portion of one of the adjacent seats. Inlet 44 communicates with the car exterior and with the car interior through a louvered, fresh air inlet 45 and a screened port 46, respectively.

With reference to FIG. 3, motor 20, fans 34 and heaters 38 are designed to be operated by direct current obtained from a third rail, in conventional fashion, from which the power to drive car 10 is derived. A main switch 50 is provided and is connected in series with fans 34 so that the operation of fans 34 is controlled by switch 50. Heater 38 and motor 20 are serially connected with switches 51 and 52 respectively, and are connected in parallel with fans 34 whereby switch 50 must first be closed to allow heaters 38 and motor 20 to be operated under the control of switches 51 and 52 respectively. Also connected in series with switch 50 is the solenoid 53 of a power failure relay 54 that includes a normally closed single pole switch 55.

Switch 55 is connected in series with a battery 56 and a single pole normally open switch 57 and fans 33. Each damper 35 is moved between positions by any suitable form of motor here illustrated as a solenoid motor 58 that works in conjunction with a return spring (not shown) to move the damper between positions, the solenoid being connected in parallel with fans 33.

*Operation*

When car 10 is placed in operation, switches 50 and 57 are closed to place fans 34 in operation and to render the emergency exhaust control system operative. Upon closing switch 50, fans 34 are operated and solenoid 53 opens switch 55 and holds it in an open position so long as power is applied to the car and switch 50 is closed. Normally, each damper 35 is in the position establishing the normal flow path whereby each fan 34 circulates air as shown by the arrows in FIG. 2a. As illustrated, fresh air is drawn into the car through inlet 45 and recirculated or return air is drawn through port 46 and mixed with the fresh air in plenum 43. This air then flows through the evaporator unit, upwardly through the duct 24 and into the car interior. This action builds up a static head in the car and the car body is designed to permit the leakage of air past the doors.

Heaters 38 and evaporators 37 are preferably thermostatically controlled. If it is desired to merely cool the air, switch 52 which may be thermostatically controlled, is closed causing motor 20 to operate the mechanical refrigeration apparatus and circulate refrigerant to evaporators 37 whereby the cooling is controlled by thermostatic operation of expansion valves 39. Similarly, heater 38 is controlled by switch 51 and can be used to temper fresh air when evaporator 37 is not in operation or to heat dehumidified air from which water has been removed by opeartion of evaporator 37.

In the event of a power failure, solenoid 53 is deenergized and switch 55 closes causing current to flow from battery 56, which is mounted somewhere on the car body, through solenoids 58, so as to move the dampers and establish the exhaust flow path, and through fans 33 to cause operation thereof. As each fan 33 operates, air flows, as illustrated by the arrows in FIG. 2b, so that fresh air is drawn into the car through the associated inlet 45 and port 46 and spent air is sucked into duct 24 and flows downwardly for discharge through outlet 31.

Such a system is especially advantageous. First, the evaporator units are mounted beneath the car so that by providing them with suitable removable panels, convenient access is had for replacemnet of filters 30 and for maintenance of the equipment. Additionally, each duct 24 is of such a diameter so as to occupy floor space which would be normally occupied by a single, average standee whereby the conditioning equipment does not utilize space that could otherwise be used for seats. Standees can readily congregate or stand around the ducts. Furthermore, the illustrated embodiment can be used in conjunction with a conventional winter heating system to provide year-round air conditioning.

While only a single embodiment has been illustrated, it will be apparent to those skilled in the art that many changes can be made in the details and arrangement of parts without departing from the scope of the invention as defined in the appended claims.

What is claimed is:

1. In a rapid transit car, the combination comprising: a closed car body having a floor and a ceiling; said floor having a plurality of openings substantially along the longitudinal centerline thereof; a plurality of tubular air ducts each covering a different one of said openings, each of said ducts being vertical and extending upwardly through the interior of the car and terminating in a distribution bulkhead adapted to direct conditioned air into the car interior; and air conditioning apparatus mounted beneath said floor, said apparatus comprising a single compressor-condenser unit and a plurality of evaporator units each connected to a different one of said ducts and adapted to blow conditioned air therethrough.

2. The combination set forth in claim 1 comprising fan means for exhausting air from the interior of the car through said ducts, storage battery means, and control means responsive to a predetermined event for connecting said fan means to said storage battery means.

3. The combination set forth in claim 1 wherein each of said evaporator units comprises: a casing having an inlet, an outlet and a reverse flow port communicating with the bottom of said duct connected thereto; moveable damper disposed in said casing; said casing being partitioned so as to define, dependent on the position of said damper, a first flow path extending between said inlet and said reverse flow port and a second flow path extending between said reverse flow port and said outlet; and first and second selectively operable fan means for moving air along said flow paths.

4. The combination set forth in claim 3 wherein said inlets of each of said evaporators are each connected so as to circulate mixed return air and fresh air along said first flow path.

5. The combination set forth in claim 4 wherein each of said evaporator units comprises an evaporator heat exchanger extending across said first flow path for cooling air flowing therealong.

6. In a rapid transit car, the combination comprising: a closed car body comprising a floor and a ceiling, said floor having a plurality of openings located substantially along the centerline of the floor; a plurality of tubular, vertical ducts covering said openings, said ducts extending between said floor and said ceiling and having at their upper ends transition ducts that open longitudinally of the car adjacent to said ceiling; and air conditioning apparatus for delivering conditioned air into said car, said apparatus comprising a single compressor-condenser unit mounted on said car body beneath said floor and a plurality of evaporator units mounted on said car body beneath said floor and said ducts, said evaporator units being operable connected to deliver conditioned air into the bottoms of said ducts, whereby such air flows upwardly through said ducts and into the interior of said car.

7. The combination set forth in claim 6 wherein each of said transition ducts comprises two ports that open longitudinally and are arranged to direct conditioned air longitudinally of the car in opposite directions along the ceiling.

8. In a rapid transit car, the combination comprising: a closed car body comprising a floor having an aisle therealong and an opening through said floor and said aisle, and a ceiling; a vertical, tubular duct mounted on said car body and covering said opening, said duct extending through the interior of said car and having at its upper end a distribution bulkhead provided with two ports that open longitudinally in opposite directions immediately beneath said ceiling; and means including selectively operable means operatively connected to pump air through said duct alternately in opposite directions so as to pump air into or out of the interior of said car.

9. The combination of claim 8 including a plurality of seats mounted on said floor and spaced from said duct so as to define a floor space around said duct adapted to accommodate a plurality of standees.

10. In a rapid transit car, the combination comprising: a floor having an opening therethrough, a fresh air inlet and a ceiling spaced above said floor; a cylindrical, tubular air duct mounted in said car body and covering said opening; a distribution bulkhead at the top of said duct opening into the interior of said car; and blower means mounted on said car body beneath said floor and arranged to draw air downwardly through said duct and exhaust such air to the exterior of said car, whereby fresh air is drawn into the interior through said fresh air inlet.

11. In a rapid transit car, the combination comprising: a car body having a floor provided with an opening located along the centerline of the car, and a ceiling; a vertical, tubular air duct mounted on said car body and covering said opening, said duct extending upwardly from said floor towards said ceiling and terminating at said ceiling in a distribution bulkhead opening into the car interior; and mechanical refrigeration apparatus mounted on said car body beneath said floor for delivering conditioned air into the car interior, said apparatus comprising a casing provided with an inlet, an outlet, and a port communicating with the bottom of said duct through said opening in said floor; a movable damper mounted in said casing; said casing being partitioned so as to define, in conjunction with said damper, two alternate flow paths, one extending from said inlet to said port and the other extending from said port to said outlet; first and second fans mounted in said casing for pumping air along said flow paths, to supply air to and exhaust air from the car interior through said duct.

12. The combination set forth in claim 11 wherein said car body is provided with a fresh air inlet; the combination further comprising a plenum chamber connected to said inlet of said casing, to said fresh air inlet and to the car interior so as to draw into said casing a mixture of fresh air and return air in response to actuation of said first blower means.

13. The combination set forth in claim 12 wherein said car body further comprises side walls having side-opening doors therein; the combination further comprises a plurality of seats mounted on said floor and including one seat adjacent to one of said doors; said plenum chamber is located beneath said seat; and said duct and floor opening are laterally aligned with said one door.

References Cited by the Examiner
UNITED STATES PATENTS

| | | | |
|---|---|---|---|
| 1,921,257 | 8/33 | Melcher | 62—239 |
| 2,034,955 | 3/36 | Parsons | 98—10 |
| 2,130,131 | 9/38 | Hirshfeld | 98—10 |
| 2,224,830 | 12/40 | Parsons | 98—10 |
| 2,232,587 | 2/41 | Brandt | 98—10 |
| 2,250,618 | 7/41 | Austin | 62—244 |

ROBERT A. O'LEARY, *Primary Examiner.*

WILLIAM J. WYE, *Examiner.*